(12) United States Patent
Senderovitz et al.

(10) Patent No.: US 11,064,459 B2
(45) Date of Patent: Jul. 13, 2021

(54) METHOD FOR INFORMING A USER ABOUT COMMUNICATION CAPABILITY MISMATCH IN A HOME NETWORK, CLIENT DEVICES AND ACCESS POINTS FOR A HOME NETWORK

(71) Applicant: MAXLINEAR, INC., Carlsbad, CA (US)

(72) Inventors: Ran Senderovitz, Ramat Gan (IL); Parul Singla, Milpitas, CA (US); Artur Zaks, Modiin (IL)

(73) Assignee: MaxLinear, Inc., Carlsbad, CA (US)

( * ) Notice: Subject to any disclaimer, the term of this patent is extended or adjusted under 35 U.S.C. 154(b) by 864 days.

(21) Appl. No.: 15/638,737

(22) Filed: Jun. 30, 2017

(65) Prior Publication Data
US 2019/0007929 A1    Jan. 3, 2019

(51) Int. Cl.
*H04W 72/02*    (2009.01)
*H04L 12/24*    (2006.01)
(Continued)

(52) U.S. Cl.
CPC ......... *H04W 72/02* (2013.01); *H04L 41/0803* (2013.01); *H04L 41/0853* (2013.01);
(Continued)

(58) Field of Classification Search
CPC . H04L 41/0803; H04L 41/0853; H04L 67/02; H04W 8/22; H04W 48/16;
(Continued)

(56) References Cited

U.S. PATENT DOCUMENTS 7,669,085 B2 * 2/2010 Alam .................... H04L 41/069
714/43
8,272,037 B2 * 9/2012 Zhang ................... H04L 63/205
726/3
(Continued)

FOREIGN PATENT DOCUMENTS

BR    112012027046 A2 *  7/2016  ............. H04W 4/20
CN    102860092 A  *  1/2013  ............ H04W 48/20
(Continued)

*Primary Examiner* — Eric Nowlin
(74) *Attorney, Agent, or Firm* — Maschoff Brennan (57) ABSTRACT

A method for informing a user about communication capability mismatch in a home network is provided. The method includes receiving first information indicative of wireless communication capabilities of an access point of the home network. Further, the method includes receiving second information indicative of wireless communication capabilities of a client device connected to the access point. The method additionally includes matching the wireless communication capabilities of the access point and the client device based on the first information and the second information. If the wireless communication capabilities of the access point and the client device do not match, the method further includes configuring the access point or the client device to cause an application executed on the client device to display mismatch information on the mismatch between the wireless communication capabilities of the access point and the client device.

25 Claims, 5 Drawing Sheets

(51) Int. Cl.
　　　*H04W 84/12*　　(2009.01)
　　　*H04W 88/08*　　(2009.01)
　　　*H04L 29/08*　　(2006.01)
　　　*H04W 8/22*　　(2009.01)

(52) U.S. Cl.
　　　CPC .............. *H04L 67/02* (2013.01); *H04W 8/22* (2013.01); *H04W 84/12* (2013.01); *H04W 88/08* (2013.01)

(58) Field of Classification Search
　　　CPC ..... H04W 72/02; H04W 76/10; H04W 84/12; H04W 88/08
　　　See application file for complete search history.

(56) References Cited

U.S. PATENT DOCUMENTS

| | | | | |
|---|---|---|---|---|
| 8,427,991 B2* | 4/2013 | Kholaif | ........... | H04W 12/04033 370/311 |
| 8,611,900 B2* | 12/2013 | Pandit | ................ | H04W 36/385 455/436 |
| 8,675,622 B2* | 3/2014 | Zuniga | ................ | H04W 24/02 370/338 |
| 9,232,465 B2* | 1/2016 | Salkintzis | ........... | H04W 36/245 |
| 9,706,491 B2* | 7/2017 | Cao | ................ | H04W 52/0219 |
| 9,749,844 B1* | 8/2017 | Sovani | ................ | H04W 8/005 |
| 9,769,743 B2* | 9/2017 | Patil | ........... | H04W 4/20 |
| 9,826,428 B2* | 11/2017 | Lee | ................ | H04L 47/115 |
| 10,042,595 B2* | 8/2018 | Behzadi | ................ | G06F 13/128 |
| 10,051,536 B2* | 8/2018 | Li | ........... | H04W 36/14 |
| 10,091,730 B2* | 10/2018 | Cao | ........... | H04W 8/18 |
| 10,356,841 B2* | 7/2019 | Ou | ........... | H04W 84/12 |
| 10,404,425 B2* | 9/2019 | Adachi | ................ | H04L 41/0896 |
| 10,412,709 B2* | 9/2019 | Shimada | ................ | H04W 76/15 |
| 10,575,246 B2* | 2/2020 | Hu | ........... | H04W 48/18 |
| 10,623,456 B2* | 4/2020 | Chiang | ................ | H04L 67/303 |
| 2005/0136898 A1* | 6/2005 | Shaheen | ................ | H04W 88/06 455/414.1 |
| 2006/0179475 A1* | 8/2006 | Zhang | ................ | H04L 67/02 726/3 |
| 2006/0206568 A1* | 9/2006 | Verma | ................ | H04L 29/12783 709/206 |
| 2008/0287062 A1* | 11/2008 | Claus | ................ | H04W 12/06 455/41.2 |
| 2010/0240370 A1* | 9/2010 | Pandit | ................ | H04W 36/385 455/436 |
| 2011/0274029 A1* | 11/2011 | Connelly | ........... | H04W 12/003 370/315 |
| 2013/0029606 A1* | 1/2013 | Wang | ................ | H04W 52/367 455/62 |
| 2013/0039275 A1* | 2/2013 | Patil | ................ | H04W 48/20 370/328 |
| 2013/0223340 A1* | 8/2013 | Jeong | ................ | H04W 48/16 370/328 |
| 2014/0006589 A1* | 1/2014 | Verrall | ................ | H04L 43/50 709/224 |
| 2015/0110087 A1* | 4/2015 | Salkintzis | ............. | H04W 36/26 370/338 |
| 2015/0201349 A1* | 7/2015 | Lee | ................ | H04W 28/0236 370/236 |
| 2015/0223192 A1* | 8/2015 | Cao | ................ | H04W 52/0219 370/252 |
| 2015/0312823 A1* | 10/2015 | Li | ................ | H04W 28/08 370/236 |
| 2016/0165381 A1* | 6/2016 | Kapoor | ................ | H04W 4/80 709/227 |
| 2016/0182514 A1* | 6/2016 | Golaup | ................ | H04L 63/10 726/4 |
| 2016/0183089 A1* | 6/2016 | Pudney | ................ | H04L 63/10 726/3 |
| 2016/0233929 A1* | 8/2016 | van Zelst | ................ | H04L 5/001 |
| 2016/0233931 A1* | 8/2016 | van Zelst | ................ | H04B 17/12 |
| 2016/0329641 A1* | 11/2016 | Lee | ................ | H01Q 1/02 |
| 2017/0311259 A1* | 10/2017 | Cao | ................ | H04W 52/0212 |
| 2018/0035292 A1* | 2/2018 | Soundararajan | ...... | H04L 67/303 |
| 2018/0084604 A1* | 3/2018 | Ou | ........... | H04W 28/16 |
| 2019/0044984 A1* | 2/2019 | Chiang | ................ | H04L 65/1089 |
| 2019/0208464 A1* | 7/2019 | Lee | ................ | H04W 48/16 |
| 2019/0313313 A1* | 10/2019 | Zheng | ................ | H04W 36/30 |
| 2019/0342891 A1* | 11/2019 | Asterjadhi | ............. | H04W 24/10 |
| 2019/0364566 A1* | 11/2019 | Husted | ............. | H04W 72/0453 |
| 2019/0373301 A1* | 12/2019 | Gunasekara | ....... | H04N 21/2393 |
| 2019/0373507 A1* | 12/2019 | Chen | ................ | H04W 24/02 |
| 2019/0373539 A1* | 12/2019 | Chen | ................ | H04W 48/16 |
| 2020/0107184 A1* | 4/2020 | Giles | ................ | H04W 8/22 |
| 2020/0107243 A1* | 4/2020 | Chen | ................ | H04W 40/34 |
| 2020/0154348 A1* | 5/2020 | Choi | ................ | H04W 4/80 |
| 2020/0213367 A1* | 7/2020 | Chiang | ................ | H04L 65/1069 |
| 2020/0214036 A1* | 7/2020 | Min | ................ | H04W 48/16 |

FOREIGN PATENT DOCUMENTS

| | | | | |
|---|---|---|---|---|
| CN | 102860092 B | * | 6/2016 | ............ H04W 36/36 |
| EP | 2561708 A1 | * | 2/2013 | ............ H04W 4/20 |
| EP | 2929721 A1 | * | 10/2015 | ............ H04W 36/22 |
| EP | 2561708 A4 | * | 6/2016 | ............ H04W 36/36 |
| EP | 2929721 A4 | * | 9/2016 | ............ H04W 36/14 |
| EP | 2929721 B1 | * | 1/2018 | ............ H04W 36/14 |
| EP | 2561708 B1 | * | 11/2018 | ............ H04W 4/20 |
| EP | 3439371 A1 | * | 2/2019 | ............ H04W 48/20 |
| EP | 3654702 A1 | * | 5/2020 | ............ H04W 48/20 |
| EP | 3439371 B1 | * | 6/2020 | ............ H04W 4/20 |
| ES | 2709186 T3 | * | 4/2019 | ............ H04W 48/20 |
| HU | E041773 T2 | * | 5/2019 | ............ H04W 4/20 |
| PL | 2561708 T3 | * | 3/2019 | ............ H04W 4/20 |
| PL | 3439371 T3 | * | 11/2020 | ............ H04W 48/20 |
| PT | 2561708 T | * | 2/2019 | ............ H04W 4/20 |
| PT | 3439371 T | * | 9/2020 | ............ H04W 48/20 |
| RU | 2012151940 A | * | 5/2014 | ............ H04W 36/36 |
| RU | 2542955 C2 | * | 2/2015 | ............ H04W 4/20 |
| WO | WO-2010107448 A1 | * | 9/2010 | ......... H04W 36/385 |
| WO | WO-2011132174 A1 | * | 10/2011 | ............ H04W 36/36 |
| WO | WO-2014079039 A1 | * | 5/2014 | ............ H04W 36/22 |

* cited by examiner

METHOD FOR INFORMING A USER ABOUT COMMUNICATION CAPABILITY MISMATCH IN A HOME NETWORK, CLIENT DEVICES AND ACCESS POINTS FOR A HOME NETWORK

FIELD

Examples relate to advising home network configuration. In particular, examples relate to a method for informing a user about communication capability mismatch in a home network, client devices and access points for a home network.

BACKGROUND

Home network infrastructure (e.g. residential gateways or range extenders) as well as client devices connected to the home network serve a consumer for several years. Standards for Wireless Local Area Networks (WLAN) such as the WiFi standard are refreshed with a 2-3 year cadence. Hence, there is a high probability that older and more recent consumer devices are connected to the home network. This may lead to capability mismatch and as a result low performance of the home network and consumer dissatisfaction.

Performance of home network depends on matching capabilities of the home network infrastructure and devices attached to the network. For example, for WiFi network capabilities this translates to the IEE 802.11 standard features supported by both WiFi access point as well as clients.

The features that may mostly impact WiFi access and overall network performance are whether devices support 5 GHz band operation in addition to 2.4 GHz, the underlying IEEE 802.11n/ac/ac Rev2/ax version of the standard, the number of radios in the device (e.g. 1×1, 2×2, 3×3, or 4×4) as well as additional features like Multi-User MIMO.

For example, a recent client device may be compliant to the WiFi baseline standard IEEE 802.11ac Rev2 which supports 1-4 Radios in 1×1, 2×2, 3×3, and 4×4 configuration in the 5 GHz band, 80 MHz channel operation, beamforming and multi-user MIMO (MU-MIMO) features. This may enable a throughput of 600 Mbps Transmission Control Protocol (TCP) traffic in 2×2 mode on access point and client, or 1.2 Gbps when two 2×2 Clients are connected to the 4×4 AP and use MU-MIMO.

An older access point in the home network may merely be compliant to the standard IEE 802.11n which supports only 2.4 GHz band operation and 2×2 radio configuration. This access point is capable to reach only 50 Mbps TCP traffic communicating with a single-radio client or 100 Mbps when the client is 2×2. Since there is no MU-MIMO feature in the standard IEE 802.11n, the maximum communication capacity of such an access point is limited to 100 Mbps that is divided between all clients connected to it.

WiFi Gateways are typically supplied by broadband internet service provider (e.g. cable or telecommunication) and have an integrated WiFi access point. Service providers replace residential gateways with frequency of about 5 years. Hence, gateways not supporting recent communication standards (e.g. IEEE 802.11ac/ac Rev2) may still be in service.

Consumer electronics, mobile and desktop computers, smartphones and tablet-computers have different purchase patterns. For example, consumer electronics (e.g. media streamers, HiFi audio, smart TV) are replaced rather unfrequently, personal computers about every 2-5 years, and smartphones about every 2-3 years. Hence, some devices (e.g. smartphones) may support the latest WiFi features (e.g. IEEE 802.11ac) while others (e.g. smart TV) may only support older WiFi features (e.g. IEEE 802.11n).

A combination of devices with different WiFi standards leads to sub-optimal performance of the home network. For example, older WiFi access points may limit the user experience of the latest smartphone model, or the other way around. Also, an older laptop may put a break on the overall network performance even if the home gateway supports the latest WiFi standard.

Typical Consumers are not aware of such intricacies, which often leads to customer dissatisfaction.

Hence, there may be a desire to identify and overcome capability mismatch between devices in a home network.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
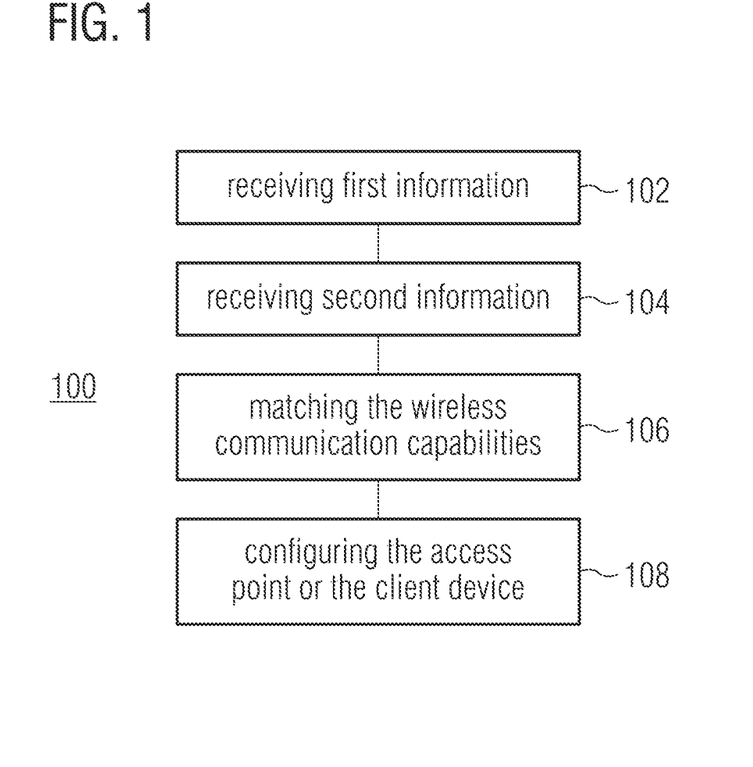
FIG. 1 illustrates a flowchart of an example of a method for informing a user about communication capability mismatch in a home network.

FIG. 1 illustrates a method 100 for informing a user about communication capability mismatch in a home network. The method 100 comprises receiving 102 first information indicative of wireless communication capabilities of an access point of the home network. Further, the method 100 comprises receiving 104 second information indicative of wireless communication capabilities of a client device connected to the access point. The method 100 additionally comprises matching 106 the wireless communication capabilities of the access point and the client device based on the first information and the second information. If the wireless communication capabilities of the access point and the client device do not match, the method 100 further comprises configuring 108 the access point or the client device to cause an application executed on the client device to display mismatch information on the mismatch between the wireless communication capabilities of the access point and the client device.

The method 100 may allow to inform a user about a communication capability mismatch in the home network. Accordingly, the user may be enabled to take countermeasures and, e.g., replace components of the home network in order to get most out of the network and improve the user experience.

The home network (home area network) is a computer network that facilitates communication among devices within the close vicinity of a home. The home network comprises a residential gateway for connecting the home network to a Wide Area Network (WAN) or the internet. For example, the residential gateway may comprise a cable modem, a Digital Subscriber Line (DSL) modem, or a wireless modem. Moreover, the residential gateway may comprise router functionality for routing data between the home network and the WAN or the internet, or routing data between devices within the home network. In addition, the residential gateway may incorporate further optional functionalities such as firewall functionality.

The access point of the home network is a hardware device that allows the client device to connect to the home network. The access point may allow wireless and/or wired connection of client devices to the home network. For example, the residential gateway may further serve as access point. However, the home network may comprise one or more further or different access points. In some examples, a wireless or a wired router may serve as access point of the home network. Alternatively or additionally, a wireless range extender (wireless repeater) may serve as access point. The wireless range extender takes an existing signal from a wireless router or a wireless access point and rebroadcasts it to create a second network.

The client device is a piece of hardware or software that accesses the home network. For example, the client device may a mobile device (e.g. mobile phone, smartphone, tablet-computer, or laptop), a computer, or consumer electronics (e.g. media streamer, HiFi audio, a smart TV). The client device may use a wired or a wireless connection for connecting to the home network.

The connection between the client device and the access point may be compliant to one or more standards. For example, a wired connection may be compliant to a standard of the IEEE 802.3 family of standards of the Institute of Electrical and Electronics Engineers (IEEE). A wireless connection may, e.g., be compliant to a standard of the IEEE 802.11 family of standards, or a standard of the IEEE 802.15.1 family of standards.

The first information and the second information comprise any information which may be used for deriving the wireless communication capabilities of the access point or the client device. The wireless communication capabilities of a device are the abilities (capabilities) of the device to wirelessly communicate with another entity. The wireless communication capabilities of a device may, e.g., comprise the standards, the frequencies or the bandwidths supported by the device. Further, wireless communication capabilities of a device may comprise enhanced communication features such as beamforming, Multiple Input Multiple Output (MIMO), or multi user MIMO.

For example, at least one of the first information and the second information may comprise information on one or more standards of the IEEE 802.11 family of standards supported by the access point or the client device. Accordingly, the method 100 may match the WLAN communication capabilities of the access point and the client device. Hence, the method 100 may allow to inform the user about WLAN communication capability mismatch in the home network. For example, if the access point supports a newer standard of the IEEE 802.11 family of standards than the client device, a communication performance between the access point and the client device may be limited. Since the method 100 comprises configuring 108 the access point or the client device to cause an application executed on the client device to display mismatch information on the mismatch between the WLAN communication capabilities of the access point and the client device, the user may be informed about the mismatch. Accordingly, the user may replace the client device with a client device supporting the same standard as the access point in order to improve the WLAN communication between both devices and, hence, improve the user experience.

The second information about the wireless communication capabilities of the client device may, in some examples, comprise information on at least one of a Media Access Control (MAC) address of the client device, an Internet Protocol (IP) address of the client device, a hostname of the client device, and open IP ports of the client device. One or more of these pieces of information may allow to identify the client device and, hence, to determine the wireless communication capabilities of the client device.

In some examples, matching 106 the wireless communication capabilities of the access point and the client device may, hence, comprise identifying a type and a manufacturer of the client device based on at least one of the MAC address of the client device, the IP address of the client device, the hostname of the client device, and the open IP ports of the client device. Based on the type and the manufacturer of the client device, the wireless communication capabilities of the client device may be derived. For example, matching 106 the wireless communication capabilities of the access point and the client device may further comprise retrieving the wireless communication capabilities of the client device from a data base based on the type and the manufacturer of the client device.

The first and/or the second information may, e.g., be read from a memory of the client device and/or a memory of the access point. For example, the first information and/or the second information may be received from a memory location within a memory of the client device and/or a memory of the access point which is assigned to an operating system of the client device or the access point, or one or more computer programs for managing the connection between the access point and the client device. A computer program for managing the connection between the access point and the client device may, e.g. be a driver for wireless communication circuit of the client device or the access point, or a network manager. Operating systems and computer programs for managing the connection between the access point and the client device usually gather a variety of information related to the wireless communication features of the devices as well as information about current wireless communication between the client device and the access point. These pieces of available information may be received and used to match the wireless communication capabilities of the client device and the access point.

The mismatch information presented to the user may, e.g., comprise information on at least one of the wireless communication capabilities of the access point, the wireless communication capabilities of the client device, and a performance limitation of the home network due to the mismatch between the wireless communication capabilities of the access point and the client device. That is, an overview about the wireless communications capabilities of the devices within the network may be presented to the user. Moreover, an impact of the wireless communications capabilities of the devices on the performance of the home network may be presented to the user. Accordingly, a user may be enabled to take countermeasures and, e.g., replace components of the home network in order to get most out of the network and improve the user experience.

In this respect, the mismatch information presented to the user may comprise information on one or more replacement options for the one of the access point and the client device exhibiting inferior wireless communication capabilities compared to the other. Accordingly, method 100 may allow a user to easily replace devices within the home network which limit the performance of the home network. In particular, the information on the replacement options may allow less technically experienced users to easily replace performance limiting devices within the home network. Hence, a user experience may be improved.

Configuring 108 the access point or the client device to cause an application executed on the client device to display the mismatch information may be done in many different ways. For example, configuring 108 the access point or the client device may comprise generating a captive portal comprising the mismatch information, and configuring the access point to return the captive portal to the client device in response to a request for accessing the internet. A captive portal is a web page which is displayed to the user before he/she can access the internet. Since the captive portal comprises the mismatch information, the method 100 may allow to inform the user about the wireless communication capabilities mismatch the next time the user tries to access the internet. Accordingly, the method 100 may ensure that the user is made aware of the wireless communication capabilities mismatch, and able to take countermeasures (e.g. be replacing the client device or the access point with one of the proposed replacement options).

The captive portal may be stored in the access point or on a web server. For example, the access point may be configured to return a Hypertext Transfer Protocol (HTTP) redirect to captive portal in response to a HTTP request by the client device. Alternatively, the access point may be configured to use an Internet Control Message Protocol (ICMP) redirect to the captive portal. Also, the access point may be configured to return the IP address of the captive portal as result of a Domain Name System (DNS) lookup.

Alternatively, the client device may get configured to display the mismatch information. For example, if the application executed on the client device is a web browser, configuring 108 the access point or the client device may comprise generating a web page comprising the mismatch information, and configuring the web browser to display the web page at web browser startup. For example, a configuration file of the web browser may be modified to replace the default start-up page of the browser with the generated web page comprising the mismatch information. Since the web page comprises the mismatch information, the method 100 may allow to inform the user about the wireless communication capabilities mismatch the next time the user starts the web browser. Accordingly, the method 100 may ensure that the user is made aware of the wireless communication capabilities mismatch, and able to take countermeasures (e.g. be replacing the client device or the access point with one of the proposed replacement options).

The method 100 may, e.g., at least in part be executed by the access point, or the client device. Alternatively, the method 100 may at least in part be executed by a cloud service in the internet. The access point, the client device or the cloud service comprise electronic circuits and/or magnetic devices for storing a program code configured to perform method 100. Further, the access point, the client device or the cloud service comprise electronic circuits for executing the program code. For example, the access point, the client device or the cloud service may comprise at least one of a processor, a digital signal processor (DSP), a network processor, an application specific integrated circuit (ASIC), a field programmable gate array (FPGA), read only memory (ROM) for storing software, random access memory (RAM), and non-volatile storage. Other hardware, conventional and/or custom, may also be included.

In the following a variety of examples for implementing the method 100 are described in connection with FIGS. 2 to 8. First, access point-based implementations of method 100 are described in connection with FIGS. 2 to 5.

Figure 2:
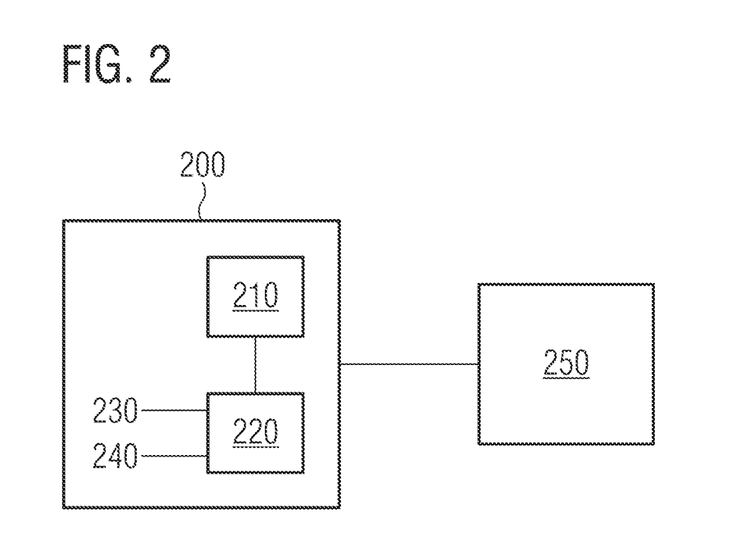
FIG. 2 illustrates an example of an access point of a home network.

FIG. 2 illustrates an access point 200 for a home network. The access point 200 comprises a memory 210 configured to store a computer program. Further, the access point 200 comprises a processor 220 coupled to the memory 210. When executing the computer program, the processor 220 is configured to receive first information 230 indicative of wireless communication capabilities of the access point 200. Additionally, the processor 220 is configured to receive second information 240 indicative of wireless communication capabilities of a client device 250 connected to the access point 220. The processor 220 is configured to match the wireless communication capabilities of the access point and the client device based on the first information 230 and the second information 240. If the wireless communication capabilities of the access point 200 and the client device 250 do not match, the processor 220 is further configured to configure the access point 200 to cause an application executed on the client device 250 to display mismatch information on the mismatch between the wireless communication capabilities of the access point 200 and the client device 250.

The access point 200 may allow to inform a user about a communication capability mismatch in a home network. Accordingly, the user may be enabled to take countermeasures and, e.g., replace the access point 200 or the client device 250 in order to get most out of the network and improve the user experience.

For example, the access point may be a residential gateway, or a wireless range extender. However, the access point is not limited to these exemplary implementations. The access point 200 may be any hardware device that allows the client device 250 to connect to the home network. For example, the access point 200 may comprise a wireless communication circuit (not illustrated) configured to wirelessly connect the access point 200 and the client device 250 (e.g. according to a standard of the IEEE 802.11 family of standards).

As indicated above, the first and the second information 230, 240 may be gathered from the access point 200 and/or the client device 250. For example, the processor 220 may be configured to receive the first information 230 and/or the second information 230 from a memory location within the memory 210 which is assigned to one or more further computer programs for managing the connection between the access point 200 and the client device 250 (e.g. a driver for wireless communication circuit of the access point 200, or a network manager). That is, processor 220 may use available information on the wireless communication capabilities of the access point 200 and the client device 250. Alternatively or additionally, the processor 220 may be configured to receive the first information 230 and/or the second information 230 from the client device 250 (e.g. in response to a request by the processor 220).

The wireless communication capabilities of the access point 200 and the client device 250 may, e.g., be WLAN (WiFi) communication capabilities. Accordingly, at least one of the first information 230 and the second information 240 may comprise information on one or more standards of the IEEE 802.11 family of standards supported by the access point 200 or the client device 250.

However, the wireless communication capabilities may alternatively or additionally be communication capabilities of the access point 200 and the client device 250 with respect to any other wireless communication technology (e.g. compliant to a standard of the IEEE 802.15.1 family of standards).

The second information 230 may, in some examples, comprise information on at least one of a MAC address of the client device, an IP address of the client device, a hostname of the client device, and open IP ports of the client device. These pieces of information may allow to determine the wireless communication capabilities of the client device 250. In this respect, the processor 220 may be configured to match the wireless communication capabilities of the access point 200 and the client device 250 by identifying a type and a manufacturer of the client device 250 based on at least one of the MAC address of the client device, the IP address of the client device, the hostname of the client device, and the open IP ports of the client device. Further, the processor 220 may be configured to retrieve the wireless communication capabilities of the client device 250 from a data base based on the type and the manufacturer of the client device 250.

As indicated above, the mismatch information may comprise information on at least one of the wireless communication capabilities of the access point 200, the wireless communication capabilities of the client device 250, and a performance limitation of the home network due to the mismatch between the wireless communication capabilities of the access point 200 and the client device 250. Further, the mismatch information may comprise information on one or more replacement options for the one of the access point 200 and the client device 250 exhibiting inferior wireless communication capabilities compared to the other.

For example, the processor 220 may be configured to configure the access point 200 to cause the application to display the mismatch information by generating a captive portal comprising the mismatch information, and configuring the access point 200 to return the captive portal to the client device 250 in response to a request for accessing the internet (by the client device 250). Accordingly, the access point 200 may ensure that the user is made aware of the wireless communication capabilities mismatch the next time the user tries to access the internet.

Figure 3:
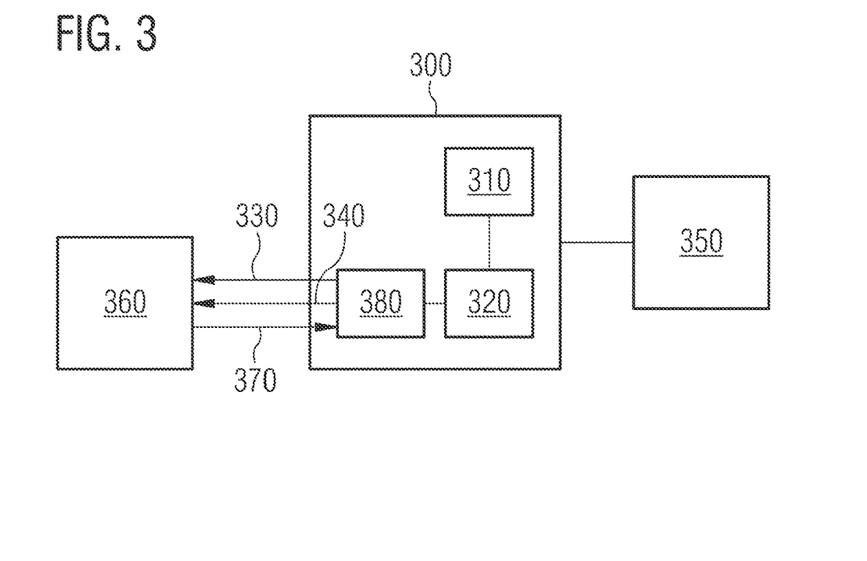
FIG. 3 illustrates another example of an access point of a home network.

An alternative implementation of method 100 is illustrated in FIG. 3. FIG. 3 illustrates another access point 300 for a home network. The access point 300 is similar to access point 200 illustrated in FIG. 3. However, in the access point 300 some functionalities are moved from the access point to a cloud service in the internet. In order to avoid unnecessary repetition, only the differences of the access point 300 compared to access point 200 are described below.

The access point 300 comprises again a memory 310 configured to store a computer program, and a processor 320 coupled to the memory 310. When executing the computer program, the processor 320 causes a communication circuit 380 of the access point 300 to send, to the cloud service 360 in the internet, first information 330 indicative of wireless communication capabilities of the access point 300, and second information 340 indicative of wireless communication capabilities of a client device 350 connected to the access point 300. If the wireless communication capabilities of the access point 300 and the client device 350 do not match, the processor 320 further causes the communication circuit 380 to receive from the cloud service 360 mismatch information 370 on the mismatch between the wireless communication capabilities of the access point 300 and the client device 380. When executing the computer program, the processor 320 is again configured to configure the access point 300 to cause an application executed on the client device 350 to display the mismatch information.

The cloud service is an infrastructure (platform) that executes program code configured to perform the above described matching, and is accessible via the internet. The cloud service may comprise a plurality of computer networks, servers, routers and/or network storages communicating with each other.

It is evident from the above description that the matching of the wireless communication capabilities is done by the cloud service 360 instead of the access point. This may allow to use a centralized cloud service for analyzing the home network. Accordingly, a required computing power of the access point 300 may be reduced compared to access point 200. This may reduce the manufacturing cost for the access point 300 (since, e.g., a less powerful processor may be used). Moreover, the centralized matching by the cloud service may allow to more easily update the matching algorithm since updates do not need to be distributed to individual access points.

Figure 4:
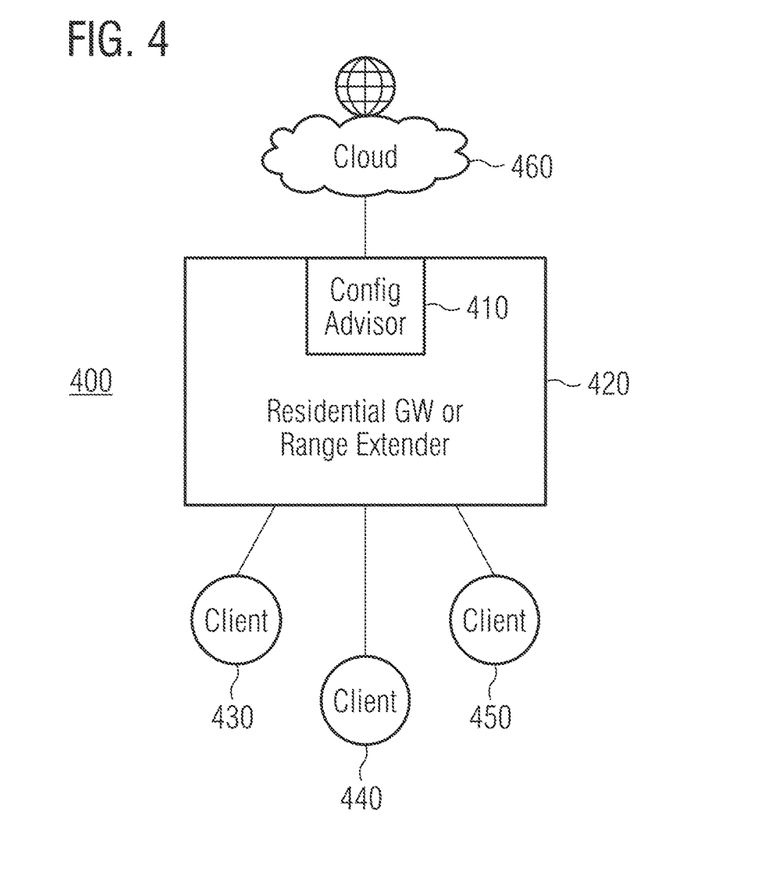
FIG. 4 illustrates an example of a home network.

In FIG. 4, an exemplary home network 400 is illustrated. A configuration advisor application 410 (i.e. an application performing above method 100) monitors the capabilities of devices in the home network 400, alerts the consumer if capability mismatch is found and advices which devices to replace to get most of the network 400 in order to improve user experience.

In the example of FIG. 4, the configuration advisor 410 is a user-mode application that is installed in a residential gateway or WiFi range extender 420 of the home network 400.

The configuration advisor captures the WiFi capabilities of connected client devices 430, 440 and 450. It analyses the WiFi capability match between the WiFi access point (i.e. residential gateway or WiFi range extender 420) and the client devices 430, 440 and 450. If a mismatch is found, the configuration advisor 410 presents the user of the client device information on the best replacement options for the client device in order to maximize the user experience.

Figure 5:
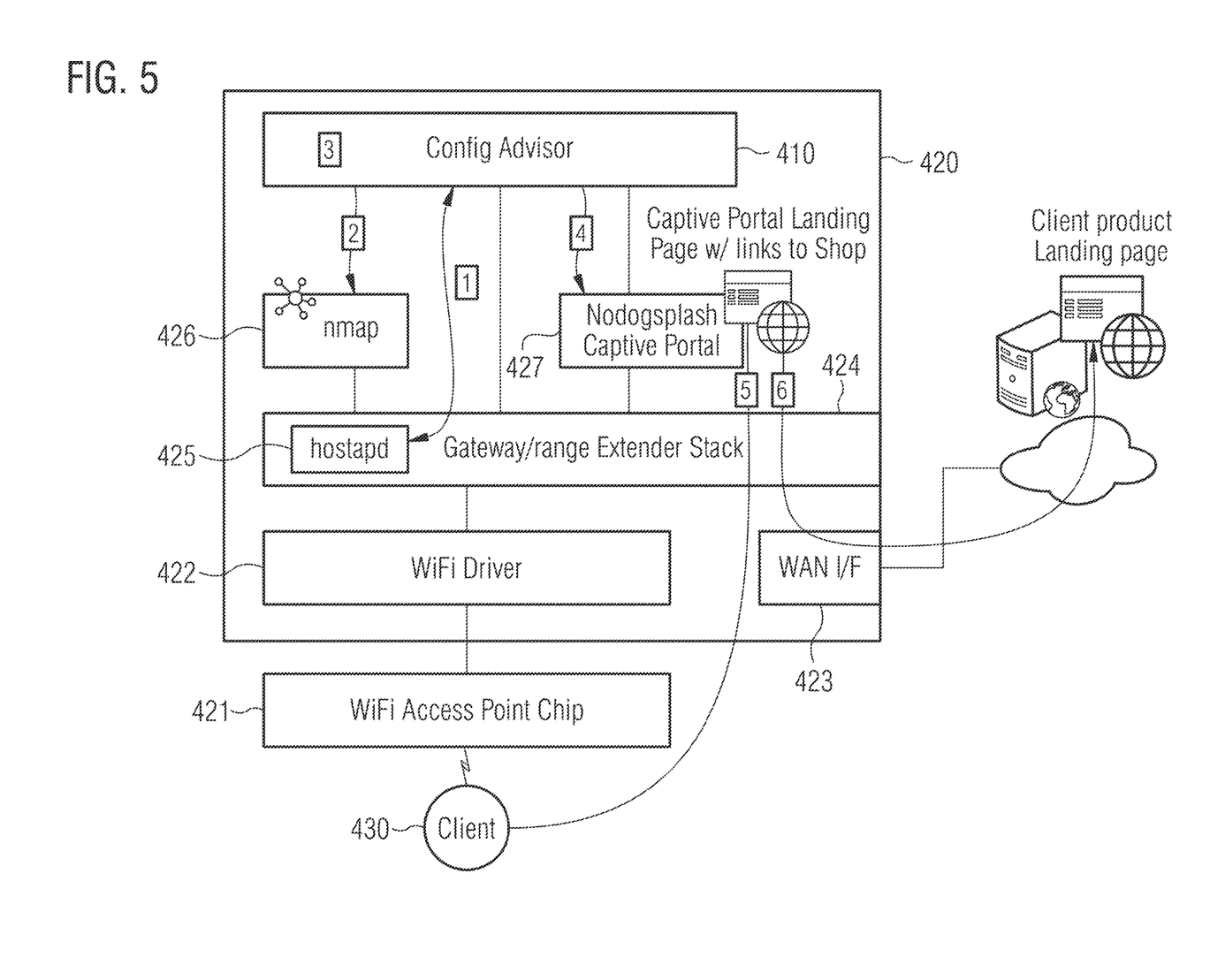
FIG. 5 illustrates an example of a work flow in an access point of the home network illustrated in FIG. 4.

A more detailed overview over the residential gateway or WiFi range extender 420 as well as an exemplary work flow of the proposed method in the residential gateway or WiFi range extender 420 is illustrated in FIG. 5.

The residential gateway or WiFi range extender 420 comprises common WiFi access point components: A WiFi access point chip 421, a WiFi driver 422, a WAN Driver 423, and a gateway or range extender stack 424.

These components enable Layer 2 (L2) connectivity to the WiFi client devices 430 and the WAN (e.g. Internet), and provides networking services (e.g. Dynamic Host Configuration Protocol, DHCP, or Network Address Translation, NAT) for client devices connected to the home network.

The gateway/range extender stack 424 contains for example the hostapd software package 425 that manages secured L2 connections of the WiFi Client devices 430 to the WiFi access point chip 421, which is part of the residential gateway or WiFi range extender 420. Applications may obtain information on IEEE 802.11 capabilities of the WiFi client devices 430 connected to the WiFi access point chip 421 through the hostapd software package 425.

Moreover, the Nmap software package 426 provides network mapper services for the residential gateway or WiFi range extender 420. Nmap may be configured to scan IP ports of the client devices connected to the residential gateway or WiFi range extender 420 and collect information on MAC addresses, IP addresses, hostnames, or IP ports open on the client devices. This information may be used by the configuration advisor 410 to identify the type of device and the device manufacturer.

The Nodogsplash software package 427 provides the functionality of a captive portal. It may be configured with a landing custom web page (e.g. a splash page) and access control restrictions for a specific client device that connects to the network. For example, a splash web page may be filled by the configuration advisor 410 to contain following information: access point WiFi capabilities, client device WiFi capabilities, explanation of capability mismatch and impact on client user experience, a link to an online shop landing page comprising client devices that have WiFi capabilities that match WiFi access capabilities in the residential gateway or WiFi range extender 420.

That is, the additional nmap utility and the additional Nodogsplash captive portal utility may enable the configuration advisor functionality.

As indicated above, the configuration advisor 410 is a user mode application responsible for analyzing the matching WiFi capabilities of the access point and connected clients by, e.g., querying hostapd, identifying Windows and Mac OS computers using information provided by nmap, configuring an appropriate splash web page and configuring a captive Portal to present this splash page to a user of a client device with mismatching WiFi capabilities.

An exemplary execution flow of the gateway/range extender-based configuration advisor 410 is described in the following. First, the client device 430 connects to the WiFi access point and the configuration advisor application 410 receives a notification. The configuration advisor 410 obtains the client device's WiFi parameters from the hostapd application 425. Then, the configuration advisor 410 requests client information from the nmap application 426. Third, the configuration advisor 410 matches the access point's and the client's WiFi parameters and detects a mismatch (e.g. client capabilities limit network and user performance). As a consequence, the configuration advisor 410 builds a splash web page with information on the access point's WiFi Capabilities, the client device's WiFi capabilities, an explanation how the client device's WiFi capabilities limit the user and the home network performance as well as a link to the landing page of recommended replacement products. Then, the configuration advisor 410 configures the splash page to the captive portal 427. When user of the client device 430 attempts to access the Internet, the captive portal 427 pushes the splash web page to the client device 430 so that the user reads the page and goes to the product landing page.

As indicated in FIG. 4, part of the above described functionalities may be executed by cloud service 460 in the internet. For example, such a cloud service may receive (e.g. from an access point such as the residential gateway or WiFi range extender 420) first information indicative of wireless communication capabilities of an access point of the home network, and further receive second information indicative of wireless communication capabilities of the client device (e.g. one of client devices 430, 440 or 450) connected to the access point. The cloud service 460 may match the wireless communication capabilities of the access point and the client device based on the first information and the second information. If the wireless communication capabilities of the access point and the client device do not match, the cloud service 460 may send to the access point mismatch information on the mismatch between the wireless communication capabilities of the access point and the client device. Additionally, the cloud service 460 may send to the access point a set of configuration instructions for instructing the access point to cause an application executed on the client device to display the mismatch information.

In the following, additional client-based implementations of method 100 are described in connection with FIGS. 6 to 8.

Figure 6:
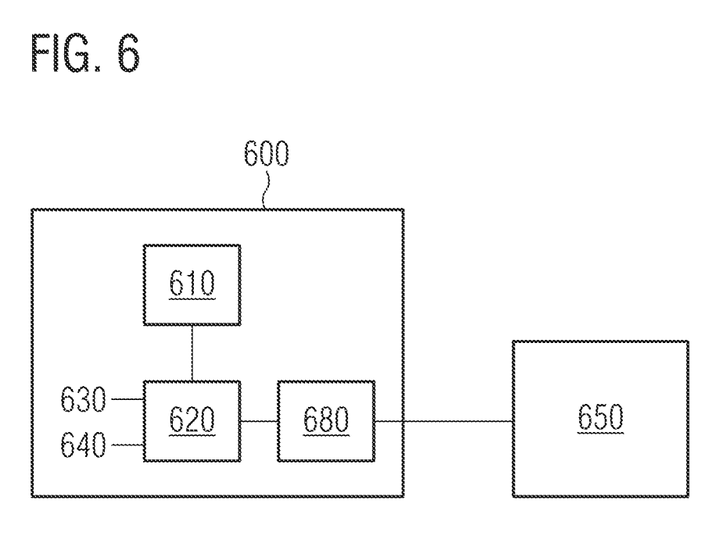
FIG. 6 illustrates an example of client device for a home network.

FIG. 6 illustrates a client device 600 for a home network. The client device comprises a wireless communication circuit 680 configured to connect the client device 600 to an access point 650 of the home network. Further, the client device 600 comprises a memory 610 configured to store a computer program, and a processor 620 coupled to the memory 610. When executing the computer program, the processor 620 is configured to receive first information 630 indicative of wireless communication capabilities of the access point 650, and to receive second information 640 indicative of wireless communication capabilities of the client device 600. Additionally, the processor 620 is configured to match the wireless communication capabilities of the access point 650 and the client device 600 based on the first information 630 and the second information 640. If the wireless communication capabilities of the access point 650 and the client device 600 do not match, the processor 620 is configured to cause an application executed on the client device 600 to display mismatch information on the mismatch between the wireless communication capabilities of the access point 650 and the client device 600.

The client device 600 may allow to inform a user about a communication capability mismatch in a home network. Accordingly, the user may be enabled to take countermeasures and, e.g., replace the access point 650 or the client device 600 in order to get most out of the network and improve the user experience.

For example, the access point may be a computer system, a mobile device (e.g. mobile phone, smartphone, tablet-computer, or laptop), or consumer electronics. However, the access point is not limited to these exemplary implementations. The client device 600 may be any hardware device that is connectable to the access point 650 of the home network.

As indicated above, the first and the second information 630, 640 may be gathered from the access point 650 and/or the client device 600. For example, the processor 620 may be configured to receive the first information 630 and/or the second information 640 from a memory location within the memory 610 which is assigned to an operating system of the client device 600 or one or more further computer programs for managing the connection between the access point 650 and the client device 600 (e.g. a driver for the wireless communication circuit 680, or a network manager). That is, processor 620 may use available information on the wireless communication capabilities of the access point 650 and the client device 600. Alternatively or additionally, the processor 620 may be configured to receive the first information 6230 and/or the second information 630 from the access point 250 (e.g. in response to a request by the processor 620).

The wireless communication capabilities of the access point 650 and the client device 600 may, e.g., be WLAN (WiFi) capabilities. Accordingly, at least one of the first information 630 and the second information 640 may comprise information on one or more standards of the IEEE 802.11 family of standards supported by the access point 650 or the client device 600 (e.g. by wireless communication circuit 680).

However, the wireless communication capabilities may alternatively or additionally be communication capabilities of the access point 650 and the client device 600 (e.g. by wireless communication circuit 680) with respect to any other wireless communication technology (e.g. compliant to a standard of the IEEE 802.15.1 family of standards).

As indicated above, the mismatch information may comprise information on at least one of the wireless communication capabilities of the access point 650, the wireless communication capabilities of the client device 600, and a performance limitation of the home network due to the mismatch between the wireless communication capabilities of the access point 650 and the client device 600. Further, the mismatch information may comprise information on one or more replacement options for the one of the access point 650 and the client device 600 exhibiting inferior wireless communication capabilities compared to the other.

For example, the application may be a web browser, and the processor 620 may be configured to cause the web browser to display the mismatch information by generating a web page comprising the mismatch information, and configuring the web browser to display the web page at web browser startup. The processor 620 may, e.g., modify a configuration file of the web browser to replace the default startup page of the browser with the generated web page comprising the mismatch information. Accordingly, the client device 600 may ensure that the user is made aware of the wireless communication capabilities mismatch at web browser startup.

Figure 7:
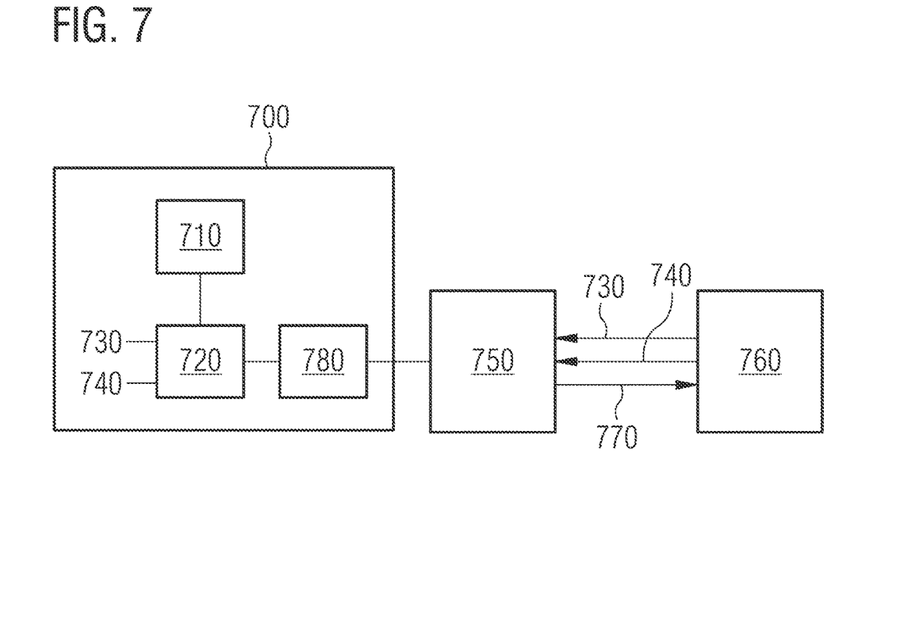
FIG. 7 illustrates another example of a client device for a home network.

An alternative implementation of method 100 is illustrated in FIG. 7. FIG. 7 illustrates another client device 700 for a home network. The client device 700 is similar to client device 600 illustrated in FIG. 6. However, in the client device 700 some functionalities are moved from the client device to a cloud service in the internet. In order to avoid unnecessary repetition, only the differences of the client device 700 compared to client device 600 are described below.

The client device 700 comprises again a wireless communication circuit 780 configured to connect the client device 700 to an access point 750 of the home network, a memory 710 configured to store a computer program, and a processor 720 coupled to the memory 710. When executing the computer program, the processor causes 720 the wireless communication circuit 780 to send, to a cloud service 760 in the internet, first information 730 indicative of wireless communication capabilities of the access point 750, and second information 740 indicative of wireless communication capabilities of the client device 700. If the wireless communication capabilities of the access point 750 and the client device 700 do not match, the processor 720 further causes the communication circuit 780 to receive from the cloud service 760 mismatch information 770 on the mismatch between the wireless communication capabilities of the access point 750 and the client device 700. When executing the computer program, the processor 720 is again configured to cause an application executed on the client device 700 to display the mismatch information.

It is evident from the above description that the matching of the wireless communication capabilities is done by the cloud service 760 instead of the client device. This may allow to use a centralized cloud service for analyzing the home network. Accordingly, a required computing power of the client device 700 may be reduced compared to client device 600. This may reduce the power consumption of the client device 700 compared to client device 600 (since less power is required for the matching). Accordingly, an operation time of the client device 700 may be increased compared to client device 600, if the client device is battery-powered. Moreover, the centralized matching by the cloud service may allow to more easily update the matching algorithm since updates do not need to be distributed to individual client devices.

As indicated in FIG. 7, the wireless communication circuit 780 may send the first information 730 and the second information 740 to the cloud service 760 via the access point 750. However, the wireless communication circuit 780 may also send the first information 730 and the second information 740 to the cloud service 760 via other routes not comprising the access point 750 (e.g. using a different communication technique or standard).

Figure 8:
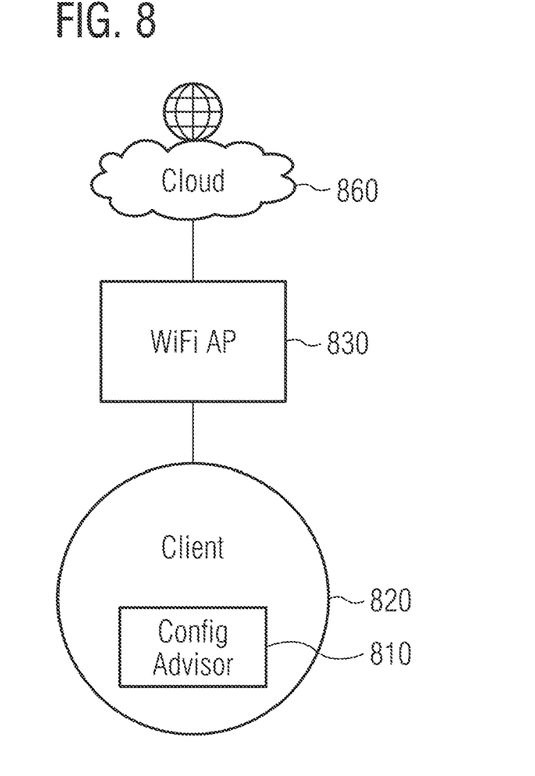
FIG. 8 illustrates another example of a home network.

In FIG. 8, an exemplary home network 800 is illustrated. In the example of FIG. 8, a client-based configuration advisor 810 (performing method 100) in a Windows or Mac OS computer 820 (being the client device) is described.

The configuration advisor 810 is an application running under Windows or Mac OS. The client-based configuration advisor 810 uses the operating system services to obtain WiFi capabilities of the WiFi access point 830 to which the client device 820 is connected to, obtain the link to the home web page of the operating system's default web browser, and update the link to the home web page of the operating system's default web browser.

For example, after the connection to WiFi access point 830 is established, the configuration advisor 810 may obtain the access point's WiFi parameters. Then, the configuration advisor 810 may analyze the match of WiFi parameters from access point 830 and client device 820. If a mismatch is detected (e.g. client device 820 supports more advanced WiFi protocol or features than access point 830), the configuration advisor 820 composes a web page (e.g. configurationadvisor.html) with one or more recommendations for a user of the client device 820. The web page contains the access point's and the client device's WiFi configuration, an explanation of the capability mismatch on the user experience, and a link to the landing page of an online shop containing recommended replacement products. Further, the configuration advisor 820 obtains the existing home web page link from the operating system and stores it in a configuration file of the configuration advisor 810 (e.g. configurationadvisor.config). Then, the configuration advisor 810 changes the home web page link to the location of the generated web page (e.g. configurationadvisor.html).

The next time the user opens the web browser, he/she will see the configuration advisor's web page that captures the WiFi capability status and the link to the recommended products.

If the configuration advisor 810 does not detect WiFi capability mismatch and the home web page is set to generated web page (e.g. configurationadvisor.html), it uses operating system services to replace the home web page link with the one stored in the configuration file of the configuration advisor 810 (e.g. configurationadvisor.config).

As indicated in FIG. 8, part of the above described functionalities may be executed by cloud service 860 in the internet. For example, such a cloud service may receive (e.g. from an client device such as the Windows or Mac OS computer 820) first information indicative of wireless communication capabilities of an access point of the home network, and further receive second information indicative of wireless communication capabilities of a client device (e.g. Windows or Mac OS computer 820) connected to the access point. The cloud service 860 may match the wireless communication capabilities of the access point and the client device based on the first information and the second information. If the wireless communication capabilities of the access point and the client device do not match, the cloud service 860 may send to the client mismatch information on the mismatch between the wireless communication capabilities of the access point and the client device. Additionally, the cloud service 860 may send to the client device a set of configuration instructions for instructing the client device to cause an application executed on the client device to display the mismatch information.

The examples as described herein may be summarized as follows:

Example 1 is a method for informing a user about communication capability mismatch in a home network, comprising: receiving first information indicative of wireless communication capabilities of an access point of the home network; receiving second information indicative of wireless communication capabilities of a client device connected to the access point; matching the wireless communication capabilities of the access point and the client device based on the first information and the second information; and if the wireless communication capabilities of the access point and the client device do not match, configuring the access point or the client device to cause an application executed on the client device to display mismatch information on the mismatch between the wireless communication capabilities of the access point and the client device.

In example 2, the mismatch information in the method of example 1 comprises information on at least one of the wireless communication capabilities of the access point, the wireless communication capabilities of the client device, and a performance limitation of the home network due to the mismatch between the wireless communication capabilities of the access point and the client device.

In example 3, the mismatch information in the method of example 1 or example 2 comprises information on one or more replacement options for the one of the access point and the client device exhibiting inferior wireless communication capabilities compared to the other.

In example 4, configuring the access point or the client device in the method of any of the preceding examples comprises: generating a captive portal comprising the mismatch information; and configuring the access point to return the captive portal to the client device in response to a request for accessing the internet.

In example 5, the application is a web browser in the method of any of examples 1 to 3, wherein configuring the access point or the client device comprises: generating a web page comprising the mismatch information; and configuring the web browser to display the web page at web browser startup.

In example 6, at least one of the first information and the second information in the method of any of the preceding examples comprises information on one or more standards of the IEEE 802.11 family of standards of the Institute of Electrical and Electronics Engineers supported by the access point or the client device.

In example 7, the second information in the method of any of the preceding examples comprises information on at least one of a media access control address of the client device, an internet protocol address of the client device, a hostname of the client device, and open internet protocol ports of the client device.

In example 8, matching the wireless communication capabilities of the access point and the client device in the method of example 7 comprises: identifying a type and a manufacturer of the client device based on at least one of the media access control address of the client device, the internet protocol address of the client device, the hostname of the client device, and the open internet protocol ports of the client device; and retrieving the wireless communication capabilities of the client device from a data base based on the type and the manufacturer of the client device.

In example 9, the wireless communication capabilities of the access point and the client device in the method of any of the preceding examples are wireless local area network capabilities.

Example 10 is a non-transitory computer readable medium having stored thereon a program having a program code for performing the method of any of examples 1 to 9, when the program is executed on a computer or processor.

Example 11 is a computer program having a program code configured to perform the method of any of examples 1 to 9, when the computer program is executed on a computer or processor.

Example 12 is an access point for a home network, comprising: a memory configured to store a computer program; and a processor coupled to the memory, wherein, when executing the computer program, the processor is configured to: receive first information indicative of wireless communication capabilities of the access point; receive second information indicative of wireless communication capabilities of a client device connected to the access point; match the wireless communication capabilities of the access point and the client device based on the first information and the second information; and, if the wireless communication capabilities of the access point and the client device do not match, configure the access point to cause an application executed on the client device to display mismatch information on the mismatch between the wireless communication capabilities of the access point and the client device.

In example 13, the mismatch information in the access point of example 12 comprises information on at least one of the wireless communication capabilities of the access point, the wireless communication capabilities of the client device, and a performance limitation of the home network due to the mismatch between the wireless communication capabilities of the access point and the client device.

In example 14, the mismatch information in the access point of example 12 or example 13 comprises information on one or more replacement options for the one of the access point and the client device exhibiting inferior wireless communication capabilities compared to the other.

In example 15, the processor in the access point of any of examples 12 to 14 is configured to configure the access point to cause the application to display the mismatch information by:

generating a captive portal comprising the mismatch information; and configuring the access point to return the captive portal to the client device in response to a request for accessing the internet.

In example 16, at least one of the first information and the second information in the access point of any of examples 12 to 15 comprises information on one or more standards of the IEEE 802.11 family of standards of the Institute of Electrical and Electronics Engineers supported by the access point or the client device.

In example 17, the second information in the access point of any of examples 12 to 16 comprises information on at least one of a media access control address of the client device, an internet protocol address of the client device, a hostname of the client device, and open internet protocol ports of the client device.

In example 18, the processor in the access point of example 17 is configured to match the wireless communication capabilities of the access point and the client device by: identifying a type and a manufacturer of the client device based on at least one of the media access control address of the client device, the internet protocol address of the client device, the hostname of the client device, and the open internet protocol ports of the client device; and retrieving the wireless communication capabilities of the client device from a data base based on the type and the manufacturer of the client device.

In example 19, the wireless communication capabilities of the access point and the client device in the access point of any of examples 12 to 18 are wireless local area network capabilities.

In example 20, the processor in the access point of any of examples 12 to 19 is configured to receive the first information and/or the second information from a memory location within the memory which is assigned to one or more further computer programs for managing the connection between the access point and the client device.

In example 21, the access point of any of examples 12 to 20 is a residential gateway.

In example 22, the access point of any of examples 12 to 20 is a wireless range extender.

Example 23 is a client device for a home network, comprising: a wireless communication circuit configured to connect the client device to an access point of the home network; a memory configured to store a computer program; and a processor coupled to the memory, wherein, when executing the computer program, the processor is configured to: receive first information indicative of wireless communication capabilities of the access point; receive second information indicative of wireless communication capabilities of the client device; match the wireless communication capabilities of the access point and the client device based on the first information and the second information; and if the wireless communication capabilities of the access point and the client device do not match, cause an application executed on the client device to display mismatch information on the mismatch between the wireless communication capabilities of the access point and the client device.

In example 24, the mismatch information in the client device of example 23 comprises information on at least one of the wireless communication capabilities of the access point, the wireless communication capabilities of the client device, and a performance limitation of the home network due to the mismatch between the wireless communication capabilities of the access point and the client device.

In example 25, the mismatch information in the client device of example 23 or example 24 comprises information on one or more replacement options for the one of the access point and the client device exhibiting inferior wireless communication capabilities compared to the other.

In example 26, the application is a web browser in the client device of any of examples 23 to 25, wherein the processor is configured to cause the web browser to display the mismatch information by: generating a web page comprising the mismatch information; and configuring the web browser to display the web page at web browser startup.

In example 27, at least one of the first information and the second information in the client device of any of examples 23 to 26 comprises information on one or more standards of the IEEE 802.11 family of standards of the Institute of Electrical and Electronics Engineers supported by the access point or the client device.

In example 28, the wireless communication capabilities of the access point and the client device in the client device of any of examples 23 to 27 are wireless local area network capabilities.

In example 29, the processor in the client device of any of examples 23 to 28 is configured to receive the first information and/or the second information from a memory location within the memory which is assigned to an operating system of the client device or one or more further computer programs for managing the connection between the access point and the client device.

In example 30, the client device of any of examples 23 to 29 is a computer system.

In example 31, the client device of any of examples 23 to 29 is a mobile device.

Example 32 is an access point for a home network, comprising: a memory configured to store a computer program; and a processor coupled to the memory, wherein, when executing the computer program, the processor is configured to cause a communication circuit of the access point to: send, to a cloud service in the internet, first information indicative of wireless communication capabilities of the access point, and second information indicative of wireless communication capabilities of a client device connected to the access point; and, if the wireless communication capabilities of the access point and the client device do not match, receive from the cloud service mismatch information on the mismatch between the wireless communication capabilities of the access point and the client device, wherein, when executing the computer program, the processor is further configured to configure the access point to cause an application executed on the client device to display the mismatch information.

In example 33, the processor in the access point of example 32 is configured to read the first information and/or the second information from a memory location within the memory which is assigned to one or more further computer programs for managing the connection between the access point and the client device.

Example 34 is a client device for a home network, comprising: a wireless communication circuit configured to connect the client device to an access point of the home network; a memory configured to store a computer program; and a processor coupled to the memory, wherein, when executing the computer program, the processor is configured to cause the communication circuit to: send, to a cloud service in the internet, first information indicative of wireless communication capabilities of the access point, and second information indicative of wireless communication capabilities of the client device; and if the wireless communication capabilities of the access point and the client device do not match, receive from the cloud service mismatch information on the mismatch between the wireless communication capabilities of the access point and the client device, wherein, when executing the computer program, the processor is further configured to cause an application executed on the client device to display the mismatch information.

In example 35, the processor in the client device of example 34 is configured to receive the first information and/or the second information from a memory location within the memory which is assigned to an operating system of the client device or one or more further computer programs for managing the connection between the access point and the client device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as a non-transitory computer readable medium or digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, ASIC, FPGA, ROM for storing software, RAM, and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for informing a user about communication capability mismatch in a home network, comprising:

receiving first information indicative of wireless communication capabilities of an access point of the home network;

receiving second information indicative of wireless communication capabilities of a client device connected to the access point;

reviewing the wireless communication capabilities of the access point and the wireless communication capabilities of the client device based on the first information and the second information;

performing a determination that the wireless communication capabilities of the access point and the wireless communication capabilities of the client device; and responsive to the determination that the wireless communication capabilities of the access point do not match the wireless communication capabilities of the client device, configuring the access point or the client device to cause an application executed on the client device to display mismatch information on the mismatch between the wireless communication capabilities of the access point and the wireless communication capabilities of the client device.

2. The method of claim 1, wherein the mismatch information comprises information on at least one of the wireless communication capabilities of the access point, the wireless communication capabilities of the client device, and a performance limitation of the home network due to the mismatch between the wireless communication capabilities of the access point and the client device.

3. The method of claim 1, wherein the mismatch information comprises information on one or more replacement options for the one of the access point and the client device exhibiting differing wireless communication capabilities.

4. The method of claim 1, wherein configuring the access point or the client device comprises:

generating a captive portal comprising the mismatch information; and configuring the access point to return the captive portal to the client device in response to a request for accessing the internet.

5. The method of claim 1, wherein the application is a web browser, and wherein configuring the access point or the client device comprises:

generating a web page comprising the mismatch information; and configuring the web browser to display the web page at web browser startup.

6. The method of claim 1, wherein at least one of the first information and the second information comprises information on one or more standards of the IEEE 802.11 family of standards of the Institute of Electrical and Electronics Engineers supported by the access point or the client device.

7. The method of claim 1, wherein the second information comprises information on at least one of a media access control address of the client device, an internet protocol address of the client device, a hostname of the client device, and open internet protocol ports of the client device.

8. The method of claim 7, wherein reviewing the wireless communication capabilities of the access point and the client device comprises:

identifying a type and a manufacturer of the client device based on at least one of the media access control address of the client device, the internet protocol address of the client device, the hostname of the client device, and the open internet protocol ports of the client device; and retrieving the wireless communication capabilities of the client device from a data base based on the type and the manufacturer of the client device.

9. The method of claim 1, wherein the wireless communication capabilities of the access point and the client device are wireless local area network capabilities.

10. A non-transitory computer readable medium having stored thereon a program having a program code for performing the method of claim 1, when the program is executed on a computer or processor.

11. An access point for a home network, comprising:

a memory configured to store a computer program; and a processor coupled to the memory, wherein, when executing the computer program, the processor is configured to:

receive first information indicative of wireless communication capabilities of the access point;

receive second information indicative of wireless communication capabilities of a client device connected to the access point;

match the wireless communication capabilities of the access point and the client device based on the first information and the second information;

perform a determination that the wireless communication capabilities of the access point and the wireless communication capabilities of the client device; and responsive to the determination that the wireless communication capabilities of the access point and the client device do not match, configure the access point to cause an application executed on the client device to display mismatch information on the mismatch between the wireless communication capabilities of the access point and the client device.

12. The access point of claim 11, wherein the mismatch information comprises information on at least one of the wireless communication capabilities of the access point, the wireless communication capabilities of the client device, and a performance limitation of the home network due to the mismatch between the wireless communication capabilities of the access point and the client device.

13. The access point of claim 11, wherein the mismatch information comprises information on one or more replacement options for the one of the access point and the client device exhibiting differing wireless communication capabilities.

14. The access point of claim 11, wherein the processor is configured to configure the access point to cause the application to display the mismatch information by:

generating a captive portal comprising the mismatch information; and configuring the access point to return the captive portal to the client device in response to a request for accessing the internet.

15. The access point of claim 11, wherein at least one of the first information and the second information comprises information on one or more standards of the IEEE 802.11 family of standards of the Institute of Electrical and Electronics Engineers supported by the access point or the client device.

16. The access point of claim 11, wherein the second information comprises information on at least one of a media access control address of the client device, an internet protocol address of the client device, a hostname of the client device, and open internet protocol ports of the client device.

17. The access point of claim 16, wherein the processor is configured to match the wireless communication capabilities of the access point and the client device by:
- identifying a type and a manufacturer of the client device based on at least one of the media access control address of the client device, the internet protocol address of the client device, the hostname of the client device, and the open internet protocol ports of the client device; and
- retrieving the wireless communication capabilities of the client device from a data base based on the type and the manufacturer of the client device.

18. The access point of claim 11, wherein the wireless communication capabilities of the access point and the client device are wireless local area network capabilities.

19. The access point of claim 11, wherein the processor is configured to receive the first information and/or the second information from a memory location within the memory which is assigned to one or more further computer programs for managing the connection between the access point and the client device.

20. The access point of claim 11, wherein the access point is a residential gateway.

21. The access point of claim 11, wherein the access point is a wireless range extender.

22. A client device for a home network, comprising:
- a wireless communication circuit configured to connect the client device to an access point of the home network;
- a memory configured to store a computer program; and
- a processor coupled to the memory, wherein, when executing the computer program, the processor is configured to:
- receive first information indicative of wireless communication capabilities of the access point;
- receive second information indicative of wireless communication capabilities of the client device;
- match the wireless communication capabilities of the access point and the client device based on the first information and the second information;
- perform a determination that the wireless communication capabilities of the access point and the wireless communication capabilities of the client device; and
- responsive to the determination that the wireless communication capabilities of the access point and the client device do not match, cause an application executed on the client device to display mismatch information on the mismatch between the wireless communication capabilities of the access point and the client device.

23. The client device of claim 22, wherein the mismatch information comprises information on at least one of the wireless communication capabilities of the access point, the wireless communication capabilities of the client device, and a performance limitation of the home network due to the mismatch between the wireless communication capabilities of the access point and the client device.

24. The client device of claim 22, wherein the mismatch information comprises information on one or more replacement options for the one of the access point and the client device exhibiting differing wireless communication capabilities.

25. The client device of claim 22, wherein the application is a web browser, and wherein the processor is configured to cause the web browser to display the mismatch information by:
- generating a web page comprising the mismatch information; and
- configuring the web browser to display the web page at web browser startup.

* * * * *